INVENTORS
KURT STEISSLINGER
HORST SIMON

Jan. 20, 1970   K. STEISSLINGER ET AL   3,490,349
PHOTOGRAPHIC CAMERA

Filed Aug. 29, 1967   5 Sheets-Sheet 2

INVENTORS
KURT STEISSLINGER
HORST SIMON

BY
ATTORNEYS

Jan. 20, 1970  K. STEISSLINGER ET AL  3,490,349
PHOTOGRAPHIC CAMERA

Filed Aug. 29, 1967  5 Sheets-Sheet 5

INVENTORS
KURT STEISSLINGER
HORST SIMON

BY

ATTORNEYS 3,490,349
    PHOTOGRAPHIC CAMERA
Kurt Steisslinger, Stuttgart-Hedelfingen, and Horst Simone,
  Stuttgart, Christof, Germany, assignors to Eastman Kodak Company, Rochester, N.Y., a corporation of New Jersey
       Filed Aug. 29, 1967, Ser. No. 664,081
  Claims priority, application Germany, Sept. 1, 1966,
             K 60,148
          Int. Cl. G03b 19/04
U.S. Cl. 95—31                               12 Claims

ABSTRACT OF THE DISCLOSURE

A camera including a filmstrip deflecting and guiding member for preventing simultaneous rewinding of two different portions of the filmstrip in contiguous or side-by-side relationship. The guiding member preferably is a roller situated between the take-up spool and the passage leading from the take-up chamber to the film gate for acting on the trailing portion of the filmstrip during film rewind to deflect one of any contiguous film portions away from the direction of travel of the other contiguous portion to prevent simultaneous passage of such portions from the take-up chamber.

---

Reference is made to the following commonly assigned co-pending applications:

U.S. application Ser. No. 505,298, Photographic Camera, filed on Aug. 27, 1965 in the names of Ernst Lieser, Horst Simon, Edwin Mueller and Kurt Steisslinger.

U.S. application Ser. No. 505,299, now Patent No. 3,420,154, Photographic Camera, filed on Aug. 27, 1965 in the name of Ernst Lieser, Horst Simon and Edwin Mueller.

The present invention relates ot photographic cameras, and more particularly to quick-loading cameras having rotatably mounted in a take-up chamber, a film take-up spool onto which a length of film is attached and wound.

Recently there has been a trend in the photographic industry toward the development of roll film cameras having features which facilitate the film loading procedure. In commonly assigned application Ser. No. 505,-298 entitled "Photographic Camera" and filed in the names of Ernst Lieser, Horst Simon, Edwin Mueller and Kurt Steisslinger on Aug. 27, 1965 and application Ser. No. 505,299, now Patent No. 3,420,154 entitled "Photographic Camera" and filed in the names of Ernst Lieser, Horst Simon and Edwin Mueller on Aug. 27, 1965, there are disclosed cameras which incorporate a novel take-up spool for facilitating the normally troublesome and tedious film loading procedure of manually fastening the film leader of a roll film package to the take-up spool. As therein described, the spool is rotatably mounted in the take-up chamber and is furcated on one axial end thereof. The furcation is substantially parallel to the axis of rotation and extends a distance parallel to the axis somewhat greater than the width of the film. Attachment of the film leader to the spool is accomplished by sliding the leader edgewise into the take-up spool furcation, which is equipped internally with means to secure the film at any point along its length. The attachment in effect divides the film leader into a leading edge portion, which extends beyond the point of contact with the take-up spool, and a trailing portion which comprises the remaining section of the film. During the initial stages of film wind-up, the leading portion of the film leader is folded back over the take-up spool and the trailing portion. As the spool continues to rotate, the leading portion subsequently becomes sandwiched between successive layers of the trailing portion on the take-up spool. The extent of the sandwiched relationship between leading and trailing portions is, of course, dependent upon the length of the leading portion; i.e., the sandwiched relationship ceases to exist after the point at which the leading edge of the leading portion becomes wound upon the spool.

In cameras of the type described, a problem may be encountered in rewinding the film from the take-up chamber after the film has been exposed. During the last one or two revolutions of the take-up spool during rewind, the leading portion of the film is presented to the take-up chamber from between two layers of the trailing portion, the upper layer being a portion of film returning to the film supply chamber and the bottom layer being a portion of the film wound about the take-up spool. Due to the inherent stiffness of film there is a tendency for the leading portion to remain in intimate contact and travel with the trailing portion in a direction toward the supply chamber. A binding problem therefore may be encountered when the leading portion passes simultaneously with the trailing portion into the exposure plane area between the film gate and the pressure plate or into the film advance or exposure counting mechanism areas of the camera. In the latter areas, binding usually results from engagement of the leading portion with a sprocket associated with these mechanisms.

Quick-loading cameras of the type herein described have been adapted for use with the well known size 135 film cassette. Cassettes are particularly well suited for use in such quick-loading cameras because of their daylight loading capability. In loading cameras adapted to receive cassettes the operator simply inserts the cassette into the supply chamber with the mouth of the cassette aligned with the film passage leading to the take-up chamber, draws the film leader across the camera exposure aperture, and attaches the film leader to the take-up spool. Under certain circumstances problems can arise when the cassette is either skewed or otherwise improperly oriented in the supply chamber. The problems may be evidenced in the form of film scratches should the film make contact with surfaces incompatible with moving film or in the form of improper feeding or jamming should the cassette rotate in the supply chamber during the wind-up or rewind procedures.

The present invention eliminates the rewinding difficulty described above by including means in the take-up chamber for disrupting the intimate relationship between the leading and trailing portions of the film leader and for compelling the leading portion to remain in the take-up chamber until safe removal of the leading portion is possible. The present invention also eliminates camera malfunctions resulting from an improperly oriented film cassette by providing the camera with means for preventing a closing of the camera back when the cassette is not properly oriented.

Further, this invention provides a camera with means for automatically and properly orienting a film cassette which has been initially improperly inserted into the supply chamber.

The invention as well as objects and advantages thereof will become more apparent to those skilled in the art from the ensuing description of the various embodiments as illustrated in the accompanying drawings, of which:

Figure 1:
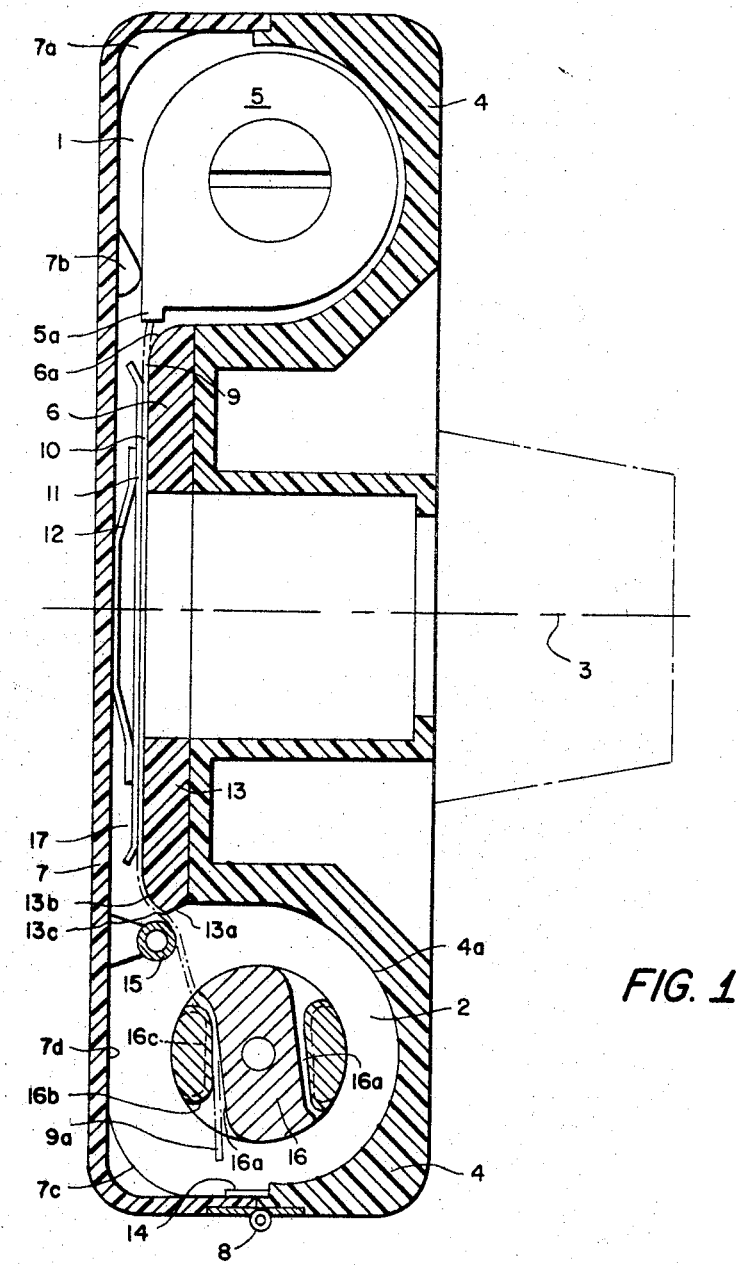
FIGURE 1 is a horizontal sectional view of a roll film camera embodying the present invention in which the camera back is closed and hinged at the side of the take-up spool, and in which the leading portion of the film leader is shown extending beyond the take-up spool.
Figure 8:
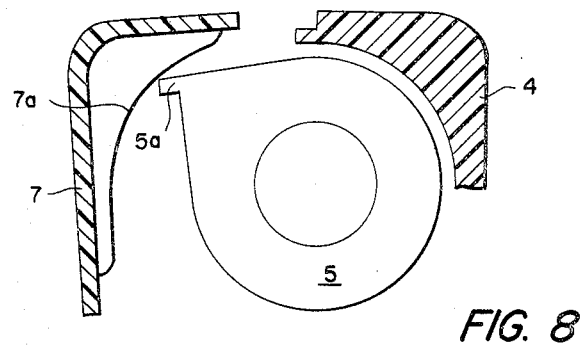
Figure 9:
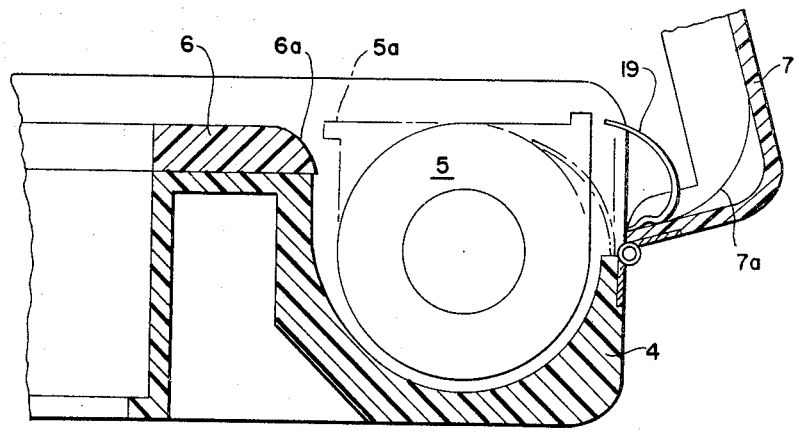

FIGURE 8 is a partial sectional view of the film supply chamber of the camera of FIG. 1 in which a fillet mounted on the camera back prevents the back from closing when the film cartridge is improperly inserted; and FIGURE 9 is a partial sectional view of a modified film supply chamber including a leaf spring mounted in the camera back for aligning the mouth of the film cartridge with respect to the guiding path, the drawing showing two phases of the back closing operation.

In accordance with the present invention a roll film camera is provided with take-up and supply chamber of such construction that the wind-up and rewind difficulties described above are eliminated. A preferred embodiment is depicted in FIG. 1 wherein a camera of the type considered is shown as having a film supply chamber 1 and take-up chamber 2 situated on opposite sides of the camera optical axis 3. The film supply chamber 1 is defined by the camera housing 4 which surrounds and supports the major portion of the film cassette 5, the surface 6a of the film guide portion 6, and the camera back 7 which is provided with corner fillet 7a and knob 7b. Corner fillet 7a prevents the camera back 7, which is pivotably mounted on hinge 8, from closing when the film cassette 5 is improperly oriented in chamber 1, as shown more clearly in FIG. 8. Knob 7b locates the cassette mouth 5a such that film 9 is aligned with the guiding path 10 which is defined by film guide portion 6 and pressure plate 11, the latter being positioned to locate the film in the focal plane by spring means 12 suitably mounted to the camera back.

The take-up chamber 2 for the exposed film is defined by the inner surface 4a of camera housing 4 which surrounds a major portion of the take-up spool 16, surface 13a of the film guide portion 13 and the camera back 7 which is provided, in the area of the take-up chamber, with light-sealing strip 14, corner fillet 7c and film deflector 15. The edge of film guide portion 13 projects into take-up chamber 2 where it terminates in a pointed nose 13c formed by the junction of slanted surface 13a and curved surface 13b. A film deflector 15 shown as a roller is located at the film receiving opening of the take-up chamber 2 and spaced from the nose 13c a distance slightly greater than the thickness of the film and is mounted on the camera back 7 so as to extend a short distance forward of nose 13c of the film guide portion, thereby creating a bend in the film path regardless of the amount of film wound upon the takeup spool. Mounted substantially concentric with the take-up chamber 2 for rotation therein is the cylindrical take-up spool 16 which is furcated at 16a in a direction parallel to the spool axis so as to receive the leading portion 9a of the film at a locus spaced from the leading edge of the film strip.

Figure 2:
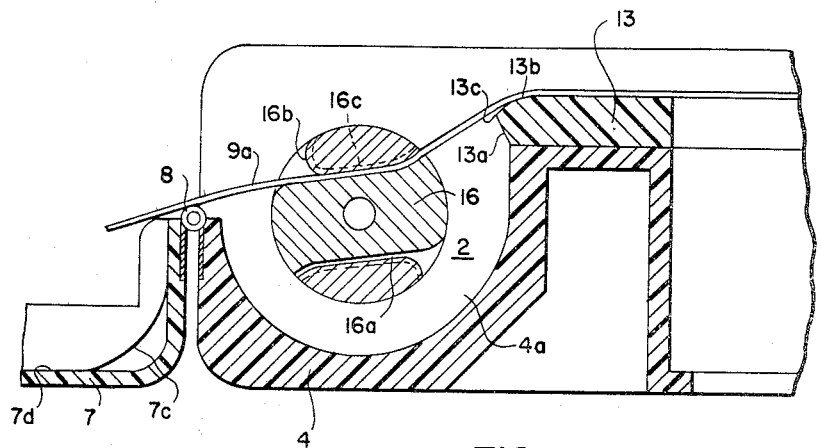
FIGURE 2 is a sectional view of a portion of the camera shown in FIG. 1 in which the camera back is shown in the open position and the leading portion of the film leader is shown extending substantially beyond the take-up spool.
Figure 3:
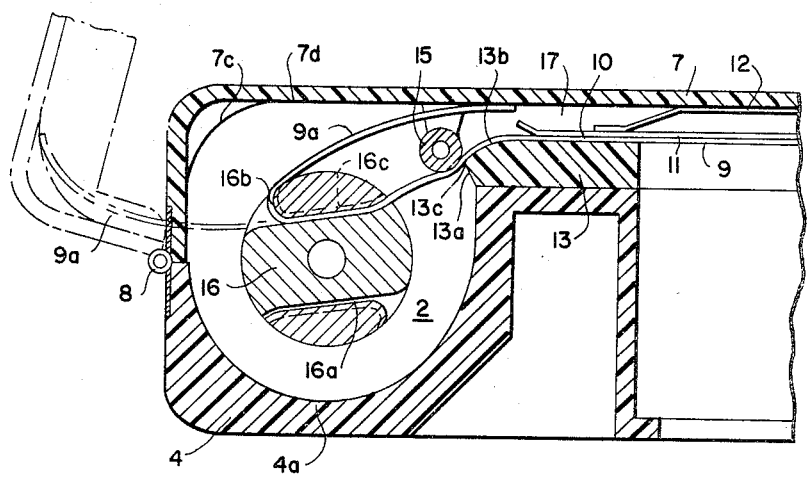
FIGURE 3 is a view similar to FIG. 2 in which the camera back and the leading portion of film leader are shown in phantom lines during a phase of the closing process, and in which the camera back is shown in full lines in the closed position.

In use, after the camera back 7 is opened by pivoting about hinge 8 to expose both film supply and take-up chambers 1 and 2 respectively, the film cassette 5 is inserted into the film supply chamber 1 such that the mouth 5a of the cassette is directed substantially perpendicular to the optical axis 3 of the camera. The leading portion of the film leader 9a extending from the mouth 5a of the film cassette is drawn across the film guide portions 6 and 13 and inserted into one of the furcations 16a of the take-up spool 16. The leading portion of the film leader 9a after loading may project over the take-up spool 16 and may extend beyond the take-up chamber as shown in FIG. 2. Upon closing of the camera back 7, as shown in FIG. 3, the leading portion 9a is, by corner fillet 7c and the inner wall 7d of the camera back 7, wrapped around the curved surface 16b of take-up spool 16, and may be guided into the channel 17 behind the pressure plate 11. If the film cassette 5 is properly oriented in the supply chamber 1 no difficulties will be experienced in closing of the camera back 7. However, if the film cassette is improperly oriented, as shown in FIG. 8, then fillet 7a will prevent closure of the camera back 7.

Assuming that the film cassette 5 is oriented properly, then the camera back is permitted to close and knob 7b will rest against the cassette mouth 5a to lock the cassette in the proper position. While the camera back is closed, film deflecting means 15 will depress the film 9 snugly against the surface 13b of the film guide portion 13. Apart from deflecting the leading portion 9a during the rewinding and winding operations, the deflecting means 15 functions to increase the contact surface of the film 9 on the take-up spool 16.

Figure 4:
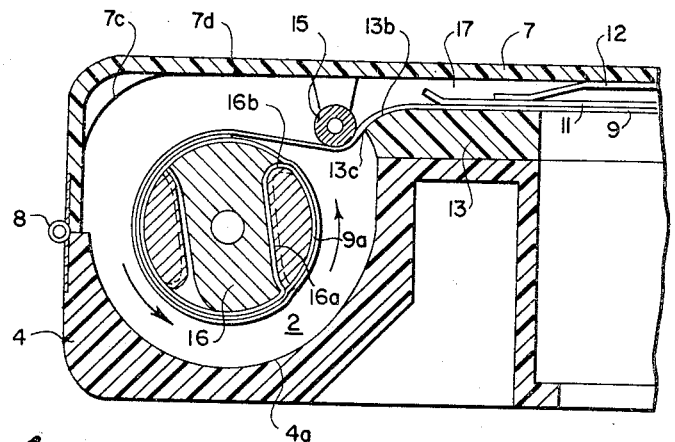
FIGURE 4 is a view similar to FIG. 3 during a phase of film winding in which the leading and trailing portions of the film leader and film have been wound onto the take-up spool.

During the winding operation to advance the film 9 past the optical axis 3, the take-up spool 16 rotates in a counter-clockwise direction as shown in FIG. 4, and the leading portion 9a becomes sandwiched with and between successive layers of the trailing portion of the film leader on the take-up spool. After the film has been exposed and wound onto the film take-up spool 16, the film 9 is rewound back into cassette 5.

Figure 5:
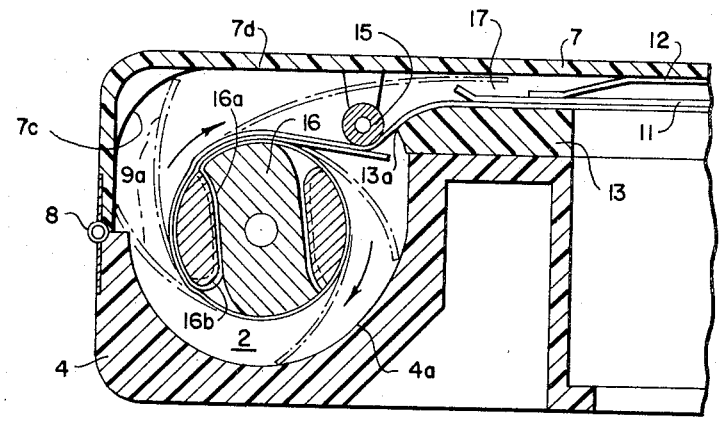
FIGURE 5 is a view similar to FIG. 4 in which the leading portion of the film leader, partly in phantom lines, is shown during the latter part of the film rewinding operation.
Figure 6:
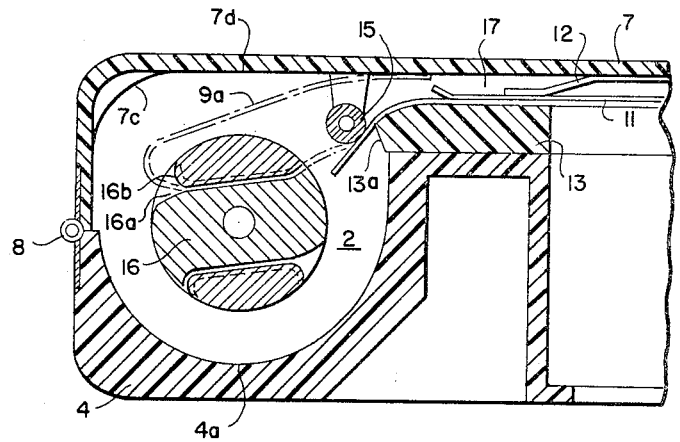
FIGURE 6 is a view similar to FIG. 5 except that the leading portion of the film leader is shown in the last part of the rewinding operation before commencing its movement from the take-up chamber.

During the rewinding operation, as shown in FIG. 5, the take-up spool 16 rotates clockwise and, as it makes its terminal revolutions, the leading portion of film leader 9a will be freed from its sandwiched position between the successive layers of film. As the rewinding operation continues there is a tendency, primarily due to the stiffness of the film, for the leading portion 9a to follow in a contiguous relationship that portion of film, under which it was wound on the take-up spool, out of the take-up chamber 2 to the supply chamber 1. According to the present invention, film deflecting means 15 operating in combination with nose 13c of film guide portion 13 disrupts this contiguous relationship by deflecting the leading portion 9a away from the direction of film travel. The leading portion 9a then passes along the inner surfaces 4a, 7c, and 7d and is directed toward channel 17. Finally, as shown in FIG. 6, the leading portion 9a is drawn about the curved surface 16b and out of the furcation 16a for rewind back pas the optical axis. In order to prevent the perforated area of the leading portion from being caught and torn in furcation 16a during its withdrawal therefrom, it is expedient to provide recesses 16c in the edge portions thereof. Thus, the outer portions of the furcations 16a are somewhat wider than the central portion thereof so as to prevent the perforated area of the film from snagging on the wall of the furcation. Thus a rapid withdrawal of the leading portion 9a from the furcation 16a is facilitated further.

Figure 7:
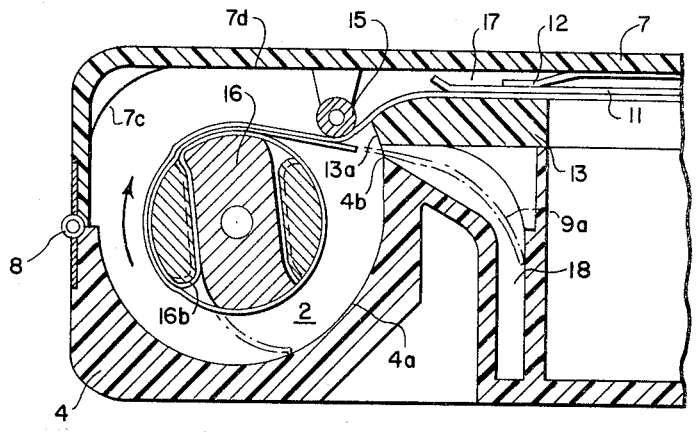
FIGURE 7 is a sectional view of a modified embodiment incorporating a channel-like formation in the take-up spool chamber in which is shown in phantom lines the leading portion of the film leader.

In another embodiment of the instant invention, as shown in FIG. 7, the leading portion 9a during rewinding is, after deflection by roller 15 moved into a channel-like extension 18 whose opening is defined by the slanted portion 13a of the film guide portion 13 and edge 4b.

During further rewinding, the leading portion 9a is then drawn out of the extension 18 and is passed along the surface 4a of the spool chamber 2 until the lateral edge of the spool furcation 16a is substantially aligned with the opening between the deflecting member 15 and nose 13c of the film guide portion 13. At this time extraction of the leading portion 9a may be readily accomplished. The function of extension 18 is to reverse the direction of curvature of the leading portion of the film 9a. By doing so, extraction of the leading portion 9a from the film spool is facilitated because a sharp bending of the film over the curved surface 16b is obviated.

According to a further embodiment of the invention as shown in FIG. 9, the camera back 7 is arranged to pivot on the side of camera housing 4 having the film supply chamber 1. Camera back 7 carries a leaf spring 19 by which the mouth 5a of the film cassette 5 is, upon closing of the camera back 7, aligned with respect to the film guiding path 10 when the film cassette is initially improperly oriented. In this case, the cassette 5 is rotated from the position shown in the full lines to the position shown in phantom lines. The fillet 7a also prevents the camera back 7 from closing when the film cassette 5 is not correctly inserted into the film supply chamber 1.

The film deflecting member 15, as shown in FIG. 1, may take the shape of a roller which may be resiliently or rigidly supported by the camera back 7. Although a roller is a preferred means for deflection, since it minimizes film scratching, it is obvious that other means would serve a like purpose.

The invention has been described in detail with particular reference to preferred embodiments thereof, but it will be understood that variations and modifications can be effected within the spirit and scope of the invention as described hereinabove and as defined in the appended claims.

We claim:

1. In a camera having means defining a film take-up chamber with a film receiving opening; a take-up spool rotatably mounted in said chamber onto which spool a film strip is wound after entering said chamber through said opening, said spool having means for attaching said strip to said spool at a locus spaced from the leading edge of said strip to divide said strip into a leading portion which extends beyond said locus and a trailing portion which comprises the remainder of said film strip; means for winding said film strip onto said spool with said leading portion being folded back over said trailing portion during the initial stage of winding to be in sandwiched position on said spool between successive layers of said trailing portion; and means for rewinding said film strip from said spool to remove the film strip from said take-up chamber through said film receiving opening; the improvement comprising:
means located in said chamber, acting on said trailing portion during rewinding of said film strip from said spool, for deflecting said leading portion away from the direction of travel of said trailing portion, when said leading portion is at least partially released from its sandwiched position, to prevent said leading and trailing portions from simultaneously passing in contiguous relationship from said chamber through said film receiving opening.

2. The invention according to claim 1 wherein said deflecting means comprises a roller member situated in said take-up chamber between said take-up spool and said opening in the chamber.

3. The invention according to claim 2 wherein said camera includes a back movable to close the take-up chamber and said roller member is mounted on said back.

4. In a camera having means defining a film take-up chamber with a film receiving opening; a take-up spool rotatably mounted in said chamber onto which spool a filmstrip is wound after entering said chamber through said opening, said spool having means for attaching said strip to said spool at a locus spaced from the leading edge of said strip to divide said strip into a leading portion which extends beyond said locus and a trailing portion which comprises the remainder of said filmstrip; means for winding said filmstrip onto said spool with said leading portion being folded back over said trailing portion during the initial stage of winding to be in sandwiched position on said spool between successive layers of said trailing portion; and means for rewinding said filmstrip from said spool to remove the filmstrip from said take-up chamber through said film receiving opening; the improvement comprising:
means located in said chamber, acting on said trailing portion during rewinding of said film strip from said spool for deflecting said leading portion away from the direction of travel of said trailing portion, when said leading portion is at least partially released from its sandwiched position, to prevent said leading and trailing portions from simultaneously passing in contiguous relationship from said chamber through said film receiving opening; and
wall means located in said take-up chamber and operating in combination with said means for deflecting said leading portion away from the direction of travel of said trailing portion, said wall means being spaced from said deflecting means and situated on the opposite side of said film strip relative to said deflecting means.

5. The invention according to claim 4 wherein the space between said wall means and deflecting means is slightly greater than the film strip thickness.

6. In a camera having means defining a film take-up chamber with a film receiving opening; a take-up spool rotatably mounted in said chamber onto which spool a film strip is wound after entering said chamber through said opening, said spool having means for attaching said strip to said spool at a locus spaced from the leading edge of said strip to divide said strip into a leading portion which extends beyond said locus and a trailing portion which comprises the remainder of said film strip; means for winding said film strip onto said spool with said leading portion being folded back over said trailing portion during the initial stage of winding to be in sandwiched position on said spool between successive layers of said trailing portion; and means for rewinding said film strip from said spool to remove the film strip from said take-up chamber through said film receiving opening; the improvement comprising:
means located in said chamber, acting on said trailing portion during rewinding of said film strip from spool, for deflecting said leading portion away from the direction of travel of said trailing portion, when said leading portion is at least partially released from its sandwiched position, to prevent said leading and trailing portions from simultaneously passing in contiguous relationship from said chamber through said film receiving opening; and
means defining a channel-like recess for temporarily receiving said leading portion after deflection thereof to reverse the direction of the fold of said leading portion as said spool rotates, thereby facilitating withdrawal of said leading portion from said spool during rewinding.

7. In a camera having means defining a film take-up chamber with a film receiving opening; a take-up spool rotatably mounted in said chamber onto which spool a film strip is wound after entering said chamber through said opening, said spool having means for attaching said strip to said spool at a locus spaced from the leading edge of said strip to divide said strip into a leading portion which extends beyond said locus and a trailing portion which comprises the remainder of said film strip; means for winding said film strip onto said spool with said leading portion being folded back over said trailing portion during the initial stage of winding to be in sandwiched position on said spool between successive layers of said trailing portion; a movable back; and means for rewinding said film strip from said spool to remove the film strip from said take-up chamber through said film receiving opening; the improvement comprising:

means located in said chamber, acting on said trailing portion during rewinding of said film strip from said spool, for deflecting said leading portion away from the direction of travel of said trailing portion, when said leading portion is at least partially released from its sandwiched position, to prevent said leading and trailing portions from simultaneously passing in contiguous relationship from said chamber through said film receiving opening; and means defining a film supply chamber to receive a film cassette having a mouth portion through which film may pass, means defining a film path between said supply and take-up chambers, and means carried by said back to prevent closure of the back when the mouth of said cassette is not aligned with said film path.

8. The invention according to claim 7 wherein said improvement further comprises means for aligning said cassette mouth with said film path during closure of said back.

9. The invention according to claim 8 wherein said means comprises a spring member carried by said camera back.

10. In a camera having means defining a film chamber and an opening in said means through which a film strip is adapted to pass into and out of said chamber; a spool rotatably received in said chamber and having means for attaching the strip to said spool such that a first portion of the strip will be folded back over a second portion of the strip in contiguous relationship when the strip is wound onto said spool; and means for unwinding the strip from said spool to remove the film strip from said chamber in a direction of travel through said opening; the improvement comprising means including a deflecting member located in said chamber and acting on the first portion of the strip during unwinding of the film strip from said spool for deflecting the first portion away from the direction of travel of the second portion to prevent the first and second portions from simultaneously passing in contiguous relationship from said chamber through said film receiving opening.

11. The improvement defined in claim 10 further comprising a wall member located in said chamber and acting on the first portion during unwinding of the film strip from said spool for deflecting the first portion away from the direction of travel of the second portion to prevent the first and second portions from simultaneously passing in contiguous relationship from said chamber through said film receiving opening, said wall member being spaced from said deflecting means and situated on the opposite side of the film strip relative to said deflecting means.

12. The improvement defined in claim 10 further comprising means defining a channel-like recess for temporarily receiving the first portion after deflection thereof to reverse the direction of the fold of the first portion as said spool rotates, thereby facilitating withdrawal of the first portion from said spool during unwinding.

References Cited

UNITED STATES PATENTS

| | | | |
|---|---|---|---|
| 2,243,460 | 5/1941 | Fischer | 95—31 |
| 2,266,426 | 12/1941 | Koszalka et al. | 95—31 |
| 2,336,278 | 12/1943 | Mihalyi | 95—31 |
| 3,002,438 | 10/1961 | Trow | 95—31 |
| 3,266,398 | 8/1966 | Kremp et al. | 95—31 |
| 3,412,662 | 11/1968 | Balalis | 95—3 XR |

FOREIGN PATENTS 1,232,457   1/1967   Germany.

JOHN M. HORAN, Primary Examiner

D. A. STALLARD, Assistant Examiner